A. C. FREEMAN, Jr.
STEAM COOKER.
APPLICATION FILED AUG. 28, 1915.

1,203,322.

Patented Oct. 31, 1916.

Inventor
Arthur C. Freeman, Jr.

By
Attorney

UNITED STATES PATENT OFFICE.

ARTHUR C. FREEMAN, JR., OF NORFOLK, VIRGINIA.

STEAM-COOKER.

1,203,322.  Specification of Letters Patent.  Patented Oct. 31, 1916.

Application filed August 28, 1915. Serial No. 47,806.

*To all whom it may concern:*

Be it known that I, ARTHUR C. FREEMAN, Jr., a citizen of the United States, residing at Norfolk, in the county of Norfolk and State of Virginia, have invented certain new and useful Improvements in Steam-Cookers, of which the following is a specification.

This invention relates to certain new and useful improvements in steam cookers.

The primary object of this invention is to provide a steam cooker that is especially adapted for steaming eggs in which the cover for the steamer constitutes the serving receptacle.

A further object of the invention is to provide a steam cooker for any desired article of food in which the water compartment is of a comparatively small size so that steam may be rapidly generated for the purpose intended and the water is conserved for repeated use in the boiling operation.

With these general objects in view and others that will appear as the nature of the invention is better understood, the same consists in the novel combination and arrangement of parts hereinafter more fully described, illustrated in the accompanying drawing, and pointed out in the appended claims.

Figure 1:
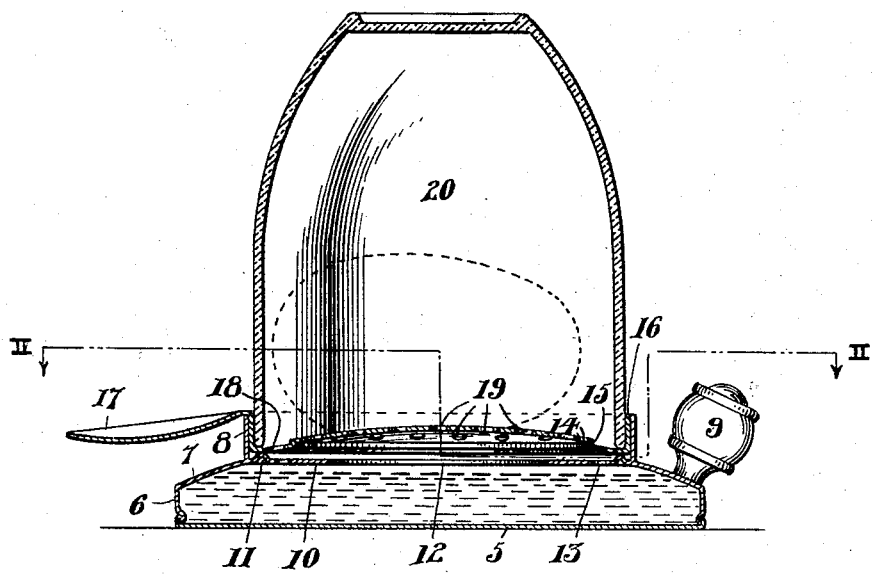
Figure 2:
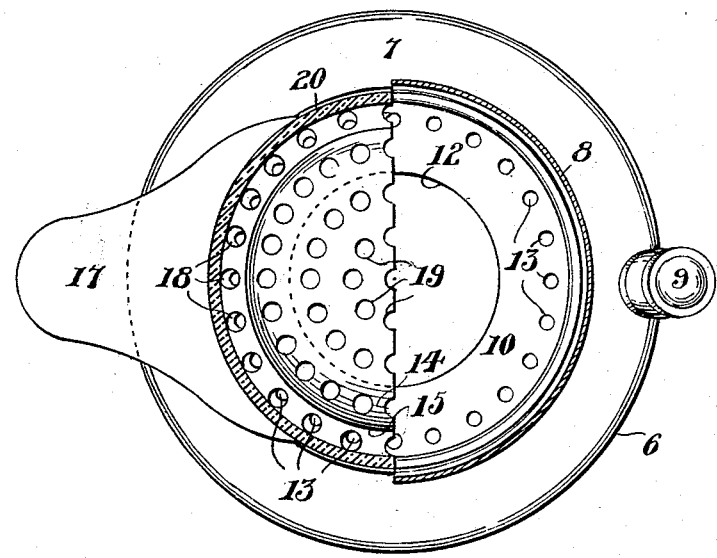

In the drawings forming a part of this application and to which like-designating characters refer to corresponding parts throughout the several views, Figure 1 is a vertical sectional view of a steam cooker built in accordance with the present invention, and Fig. 2 is a horizontal sectional view taken on line II—II of Fig. 1.

According to my invention there is provided a steam cooker that is especially adapted for the steam cooking of eggs, potatoes, etc., which includes a water compartment and a steaming chamber associated therewith. A lift handle is provided for the device while a removable tray is positioned in the open upper end of the water receptacle and forms a support for the articles to be steamed. The cover for the cooker constitutes a steaming chamber and is also utilized as a serving receptacle for the article that is cooked.

Referring more in detail to the accompanying drawing, there is shown a water receptacle that is preferably formed cylindrical in plan view and including a bottom wall 5, a peripheral wall 6 and an upper wall 7 that is directed inwardly for a slight distance and continues in an upward direction as at 8 to provide a vertical upper side wall. A handle 9 of suitable construction is preferably attached to the cover wall 7 and constitutes means for lifting the same.

An inwardly directed flange 10 is carried by the inwardly directed cover wall 7 at the point where the lower edge of the upper side wall is connected thereto and as shown in Fig. 1 overlies the bottom wall 5 of the water compartment to provide a partial cover therefor in combination with the wall 7. An upstanding annular bead 11 is carried by the flange 10 adjacent the upper side wall 8 to constitute a support for the article carrier. The central portion of the flange 10 is provided with an enlarged circular opening 12, while the same is provided between the bead 11 and central opening 12 with a series of circularly arranged openings 13. The article carrier or support upon which the articles to be cooked are placed comprises a tray member embodying an upstanding central portion 14 which curves gradually from the rim 15, to the center, the latter being the high point, the rim having an upstanding side wall 16, while a handle 17 is carried by one side of said wall 16. Openings 18 are arranged in circular series in the member 15 and when the tray is positioned within the water heater, the said openings are positioned above the openings 13 of the flange 10. The entire surface of the upstanding central portion 14 of the tray is provided with a plurality of openings 19 that overlie the enlarged central opening 12 in the flange 10. The support 14 is gradually curved from the rim to the center that the condensed steam may be drained to the side and thence to the bottom receptacle, the steam in the center being thus prevented from cooling before it becomes effective.

An improved feature of the present invention is the cover for the cooker that also constitutes the serving receptacle, this cover being preferably in the form of a glass or porcelain cup 20 that is inverted and received within the upstanding side walls 16 of the tray 14. The water compartment and tray can be constructed so that the present-day form of jelly glass may be used as a cover therefor, which will decrease the market price of the device, although it is to be understood that the steam cooker herein described may be a complete device that includes the cover wall in a complete construction.

In assembling the parts, water is first filled in the water compartment and the device may be positioned over any preferred form of heating medium such as an alcohol lamp or gas stove after which the tray 14 is positioned within the water compartment and has the rim 15 thereof resting upon the bead 11, while the side wall 16 thereof may frictionally engage the upper side wall 8 of the water compartment. The article to be cooked may then be placed upon the tray 14 there being shown in dotted lines an egg, and the cover 20 may then be positioned as indicated in Fig. 1. As the steam is generated in the water compartments the same escapes through the central opening 12 and the circularly arranged openings 13 in the flange 10 and subsequently through the openings 18 and 19 in the tray to completely fill the cover 20 and steam-cook the articles contained therein, after which operation of the device the cooking steam within the cover 20 condenses and returns to the water receptacle. In this manner the water is used over and over again in the steamer without being wasted and does not require replenishing after repeated use thereof. When the article to be cooked has been steamed for a sufficient amount of time, the tray 14 may be removed from the water compartment by the tray handle 17 and the egg upon the tray and within the cover 20 may be conveyed to the desired plate, and subsequently inverted so that the cover 20 which also constitutes the serving receptacle may receive the cooked article and the tray removed from the upper edge thereof. The water compartment is constructed of comparatively small size so that steam may be quickly generated and an article may be cooked in a hasty manner.

While the forms of the invention herein shown and described are what is believed to be the preferred embodiment thereof, it is nevertheless to be understood that minor changes may be made therein without departing from the spirit and scope of the invention as claimed.

What I claim as new is:—

1. A steam cooker comprising a water receptacle including an inwardly directed annular flange having a central opening, a perforated tray positioned within said receptacle and resting upon said flange with the side walls of the tray in frictional engagement with said receptacle, and an inverted cover wall supported at its lower end upon said tray and in frictional engagement with the side walls of the tray.

2. A steam cooker comprising a water receptacle having an upstanding side wall, an inwardly directed annular flange carried by said receptacle, an upstanding annular bead formed on said flange, there being openings in said flange adjacent the outer edge, and an enlarged central opening, a perforated tray including a raised central portion and a depressed annular portion mounted upon said flange bead, a side wall carried by said tray adapted frictionally to engage the upstanding side wall of the water receptacle, a handle carried by said tray and a cover having its open end received in said tray and frictionally engaging the said walls thereof.

3. A steam cooker including a water receptacle, an inwardly directed annular flange carried by the side wall thereof, an upstanding bead carried by said flange adjacent the side wall, an article supporting tray mounted upon said bead and spaced from said flange, and a cover constituting a serving receptacle mounted on said tray to constitute a steaming chamber, the said receptacle to be removed upon the removal of the tray and a handle carried by the tray projecting outwardly of the water receptacle and cover.

In testimony whereof I affix my signature in presence of two witnesses.

ARTHUR C. FREEMAN, Jr.

Witnesses:
 ALICE V. STROMHAND,
 M. M. OUTLEN.

Copies of this patent may be obtained for five cents each, by addressing the "Commissioner of Patents, Washington, D. C."